(12) United States Patent
Biester et al.

(10) Patent No.: US 6,898,968 B2
(45) Date of Patent: May 31, 2005

(54) METHOD AND DEVICE FOR MEASURING A PATH THAT HAS BEEN COVERED

(75) Inventors: Klaus Biester, Wienhausen (DE); Peter Kunow, Berlin (DE)

(73) Assignee: Cooper Cameron Corporation, Houston, TX (US)

( * ) Notice: Subject to any disclaimer, the term of this patent is extended or adjusted under 35 U.S.C. 154(b) by 72 days.

(21) Appl. No.: 10/344,921

(22) PCT Filed: Aug. 17, 2001

(86) PCT No.: PCT/EP01/09513

§ 371 (c)(1),
(2), (4) Date: Feb. 18, 2003

(87) PCT Pub. No.: WO02/21072

PCT Pub. Date: Mar. 14, 2002

(65) Prior Publication Data

US 2003/0177848 A1 Sep. 25, 2003

(30) Foreign Application Priority Data

Aug. 18, 2000 (EP) .......................... 00117841

(51) Int. Cl.$^7$ ............................. G01M 19/00
(52) U.S. Cl. ...................................... 73/168
(58) Field of Search ............... 73/161, 168, 760

(56) References Cited

U.S. PATENT DOCUMENTS 3,782,653 A * 1/1974 Jones .................... 242/413.4
4,423,747 A * 1/1984 Heiser et al. .............. 137/85
4,844,554 A * 7/1989 Rojecki .................. 303/22.7
5,038,622 A    8/1991 Tijmann ................ 73/862.39
5,806,761 A * 9/1998 Enoki et al. .............. 236/12.2
6,041,667 A * 3/2000 Pischinger et al. ...... 73/862.69
6,668,639 B2 * 12/2003 Fong et al. ................ 73/161

OTHER PUBLICATIONS

Chr. Rohrbach: *Handbuch für elektrisches Messen mechanischer Grössen;* 1967, Vdl—Verlag, Dusseldorf (DE) XP002156890 (pp. 448–449).

* cited by examiner

*Primary Examiner*—Max Noori
(74) *Attorney, Agent, or Firm*—Conley Rose, P.C.

(57) ABSTRACT

A displacement measuring device measures a path of a moving object that can be displaced in a direction has at least one first component that is allocated to the moveable object and a second, stationary component. The components are interlinked for the purpose of converting a movement and/or displacement of the moving object into an electrical signal. The displacement measuring device also has an evaluating device for converting the electrical signal into movement and/or position information. The displacement measuring device has a high degree of accuracy, is not susceptible to wear, is resistant to vibration, shocks, or corrosion and is economical to use in almost all media. To this end, the first component is a spring element connecting the moving object and the second component is a force-measurement device which releases an electrical signal corresponding to the force that is exerted on the spring element.

16 Claims, 3 Drawing Sheets

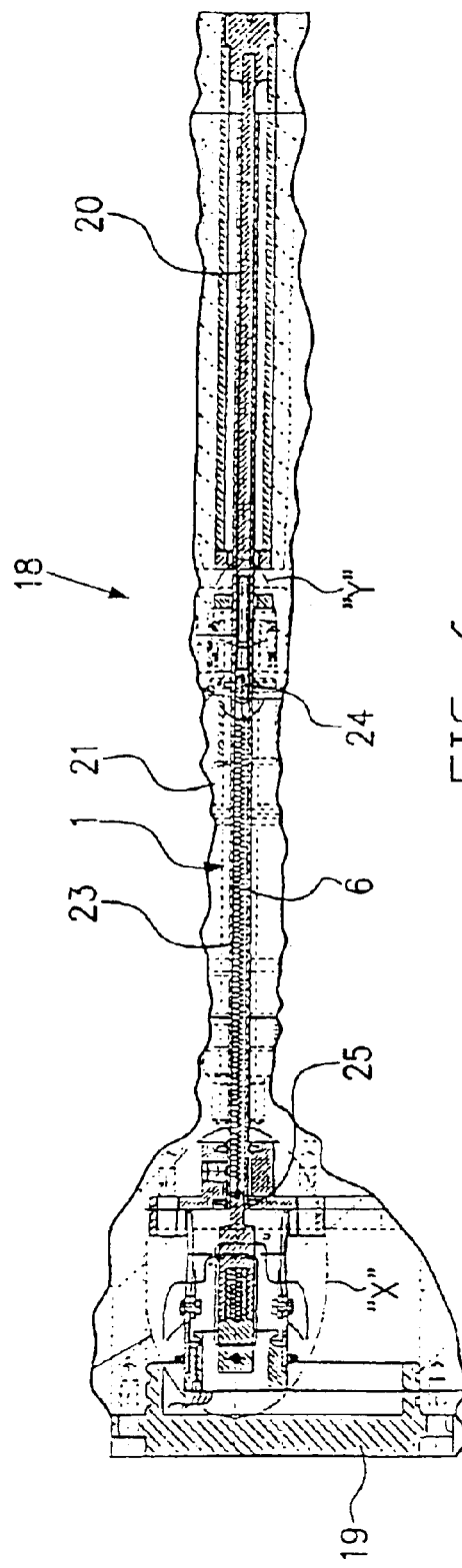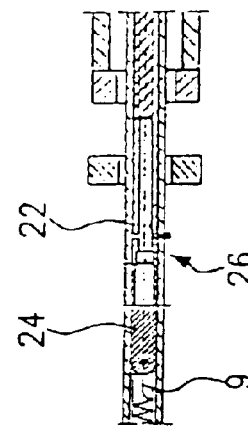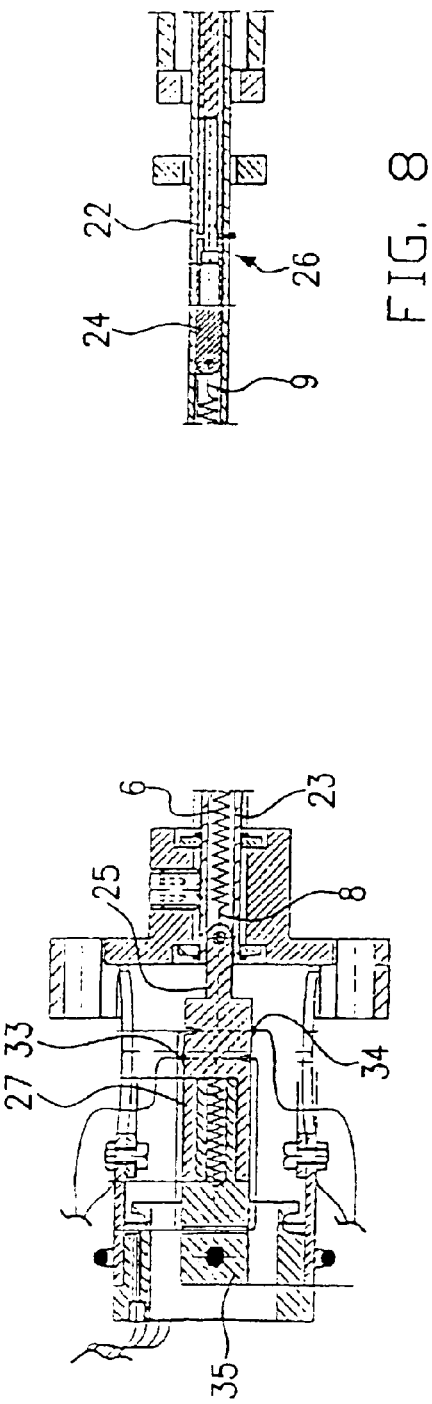
FIG. 6
FIG. 8
FIG. 7

METHOD AND DEVICE FOR MEASURING A PATH THAT HAS BEEN COVERED

The invention concerns a method and a device for measuring a path covered.

A corresponding path measuring device for measuring a path covered by a moving object deflected along a direction is known from practice. A first component of the path measuring device is associated with the moving object with the latter. A second component of the path measuring device is stationary. The two components are coupled with one another in order to convert the motion and/or deflection of the moving object into an electric signal. This electric signal is transmitted to an evaluation arrangement of the path measuring device and converted there into motion and/or position information.

An example of such a previously known path measuring device is a potentiometer-like sensor. A wire wound as a coil forms the first component of this sensor and the second component is formed by a contact element capable of moving along the coil winding. Depending on the position of the contact element relative to the coil winding a corresponding resistance is produced for a current flowing through coil winding and contact element, which may be converted into position information.

A further example of a known path measuring device is a magnetic or inductive path measurement. In the case of the latter a coil or a part of a condenser is connected with the moving object and a further coil or the other part of the condenser is made stationary.

Further known path measuring devices use, for example, optical sensors, the motion of a first component moved with the moving object being determined optically and converted by the stationary sensor into a corresponding motion signal. Finally, laser devices for path measurement are known.

There are different disadvantages in the case of these previously known path measuring devices.

Optical measurements are indeed very precise, but at the same time very sensitive, and only usable in the case of good visual conditions, and at the same time they are quite expensive.

Magnetic or inductive devices are sensitive to vibrations, shocks, or the like, and as a rule also are quite expensive. Potentiometer-like sensors are quite imprecise and have only a relatively short service life because of wear phenomena.

Therefore the object of the invention is to improve processes or path measuring devices of the type name initially so that the path measurement may be used with high accuracy, without wear, insentive to vibrations, shocks, or corrosion and economically in almost all media without special sealing and in any pressure range.

This object is achieved according to the device by having the first component be a moving object and the second component be a connecting spring and the second component be a force measurement device that emits an electric signal corresponding to a force exerted on the spring element.

According to the process, the object is achieved by having the moving object move against the resistance of an elastically expandable retaining element along an essentially linear path, having the retaining force appearing in the retaining element be measured in relation to the path covered by the moving object and a signal corresponding to the retaining element be transmitted from the force measuring device to an evaluation device, and the path covered by the moving object corresponding to the retaining element be determined there.

The path measurement device according to the invention is simply designed. The spring element is expanded in the case of motion of the moving object, the retaining force appearing in the spring element in the simplest case is directly proportional to the path covered by the moving object. The retaining force is transferred through the spring element to the force measuring device and measured there.

In this case a corresponding electric signal is received by an evaluation device connected with the force measuring device that corresponds to the retaining element and thus to the path covered by the moving object. The components used for the path measuring device according to the invention are made simply and economically. No wear of these components takes place, since, for example, no friction appears between the components or between the components or other objects. The path measuring device is independent of a medium in which it is located, the viusal conditions, vibrations, shocks, or the like.

In the case of a simple embodiment the spring element may be a spiral spring, that is connected by one of its ends on the moving object and by its other end with the force measuring device. The spiral spring may be chosen so that a coercive force exerted on the moving object and thus a limitation of the other mobility of the moving object is quiet small, and at the same time the coercive force is great enough to obtain sufficiently strong signal by means of the force masuring device. In the case of using such a spiral as a spring element it furthmore proves to be the case that in the path measuring device according to the invention no moving parts actually are present together with the moving object. The spiral spring, respectively the spring element, in particular may be chosen so that they stretch proportional to the coercive force, so that the evaluation of the signal of the force measuring device, and correspondingly the determination of motion or position of the moving object, is simplified.

Such a spring element may be chosen as required with corresponding elastic constants, from corresponding material and the like. At this point its to be noted that in the case of the path measuring device according to the invention or the corresponding measuring method only a limited motion of the moving object is possible because of the connection with the spring element and, via the latter, with the force measuring device. Essentially the range of motion is determined by the spring element and the maximum elongation thereof that may be evaluated.

According to the invention it is possible that the spring element follows a curved, for example, circular path of the moving object and correspondingly the position of object along this path may be determined. A simple embodiment of a path measuring device without a curved course of the spring element and without friction that may possibly appear between spring element and guide may be seen when the spring element is essentially stretch out straight. In this case it is further advantageous if the moving object also moves in a straight line.

In order to adapt the path measuring device to different requirements in a simple way, such as, for example, longer paths to be covered by the moving object, or the like, the spring element may be replaceable. Thus, the spring elements may be chosen corresponding to their maximum expansion.

The force measuring device may be constructed in a different way. According to the invention such a force measuring device must convert the force exerted on it into a corresponding electric signal, which then is detected and processed by the evaluating unit.

In the case of a simple embodiment that is economical to produce, force measuring device has at least one electrically conducting, in particular wire like conductor, the electric resistance of which is dependent on a force exerted on it in the longitudinal direction. Such a conductor may be produced out of different materials, that, for example, are chosen with respect to the enviromental conditions, under which the path measuring device is used. In this way the path measuring device also may be used in aggressive media, under water, under pressure, under a vacuum, and the like essentially without limitations. The simple construction of the path measuring device results in no wear and no wearing of the individual parts, so that the service life is extraordinarily high.

Since a spring element, as a rule, has a soft damping characteristic, corresponding vibrations, shocks, or the like are transferred without influence on the force measuring device.

Such an electric conductor as a force measuring device changes its electric resistance, and such a resistance change in the case of exertion of a corresponding tensile force on the conductor may be detected via corresponding voltage or current changes and evaluated as a signal in the evaluating device.

In order to determine a zero point for path measurement in a simple way, the spring element may be pre-stressed, and a corresponding motion or position signal is determined by the evaluating unit only in the case of further tension of the pre-stressed spring element.

In order to compensate certain statistical irregularities of the wire, such as diameter deviations, changes in the material quality and so forth in a simple way, the conductor may have a number of electrically conducting wire arranged parallel to one another. In this way corresponding statistical deviations of the individual wires are determined and this results in a force measuring device measuring precisely over its entire measuring range.

The wires may be individual wires or be formed by an individual wire that is laid in meandering fashion.

In order to be able determine changes in the resistance in such an electric conductor in a simple way, the electrical conductors may be switched in a bridge circuit, such as a so-called Wheatstone bridge, and at least form a resistance in the bridge circuit. Highly accurate measurements are possible by means of such a bridge circuit, which also results in high accuracy for determining the position of the moving object.

In order to compensate for changes in the resistance of the conductor on the basis of temperature changes, so that the latter do not lead to a false determination of the position of the moving object, the bridge circuit may have a further resistance to the resistance formed by the force measuring device. If the force measuring device consists, for example, of a number of wires, this further resistance is formed in the same way. Of course, as opposed to the force measuring device, it is not exposed to any corresponding tensile force through the spring element.

According to the invention, the use of the bridge circuit and the electrically conducting wires as a force measuring device results in a simple electrical structure, which also requires only simple means for the evaluation device. For example, an amplifier and/or a differentiator and/or an output device are connected with a microprocessor or the like, which are the only electronic components that are necessary. The differentiator may be absent if, for example, the speed or acceleration of the moving object is not determined in the case of motion of the latter. In addition, devices of different evaluation devices ma be used if the latter, for example, may be adjusted by software.

By means of a simple, rugged, and safe construction of the path measuring device according to the invention, the latter is suited, in particular, for remote operation and inaccessible areas. For example, one area of application is the use of the previously described measuring device for a moving object of a device for gas and/or oil production moving linearly. Corresponding devices include so-called actuators, blowout preventors, valves, and the like, as are necessary in oil and gas production. In this case the area of use of the path measuring device according to the invention is not limited to uses on land, but use under water is also possible because of the insensitivity with respect to pressure or other inhospitable environmental influences. This obtains analogously for use underground.

It is to be noted that the path measuring device according to the invention naturally is not limited to devices for oil and/or gas production, but may be used in other machines, in production, in earth-working device, and the like. Essentially the path measuring device according to the invention may be used everywhere where a moving object moves over a limited area, in particular linearly back and forth.

In the case of oil and gas production, in particular, a number of linear actuation devices are used, one of which is described, for example, in DE 20 008 415. Such a linear actuation device serves in particular, for the actuation of valves, chokes, or the like in oil and/or gas production, and has at least one actuation element placed capable of moving linearly within a housing and a drive device associated with the latter. The actuation element may be a spherical spindle that is placed capable of turning in a corresponding nut. The nut is connected moving with the corresponding drive device, and a rotation of the nut induced thereby is converted into a longitudinal motion of the spherical spindle. Here again DE 20 008 415 is to be consulted for a further description of this linear actuation.

In order to determine the position of the actuation element relative to the housing in a simple way with such a linear actuation device, according to the invention the actuation element is connected at one end with a spring element, which with its end turned away from the actuation element with a force measuring device, that transmits to an evaluation device an electric signal corresponding to a force transferring from the spring element to the force measuring device. This means, that the linear actuation device according to the invention is characterized by the fact that path measuring device described above is built into the former.

Correspondingly, the path measuring device in the linear actuation device may have the same features as the previously described path measuring device. Some further configurations, which are described below, follow from the inclusion of the path measuring device in the linear actuation device.

For example, in order to protect the spring element from damage from the moving parts of the linear actuation device, the spring element may be located and guided in a tube.

In order to be able to fasten the spring element at its ends to the actuation element as well as to the force measuring element in a simple way, the spring element may have corresponding connecting pieces on its ends. Then the spring element may be suspended with its ends on these pieces and the connecting piece then is to be attached releasable by being screwed or the like to the actuation element or to the force measuring device. device.

In the case of a linear actuation device, that has an actuation element moving linearly forward in a spiral motion, it is advantageous if the corresponding rotation of the actuation element is not transferred to the spring element and thus leads to a tension or force in the spring element, that is not caused by the linear motion of the actuation element. For this, for example, at least the connecting piece may have a rotation coupling device between spring element and actuation element. By means of this rotation coupling device only the linear motion of the actuation element is transferred to the spring element and the rotation is received by the rotation coupling element.

The force measuring device may be made correspondingly, in order to convert the tensile force exerted by the spring element into an electric signal. A simple example of such a force measuring device may be seen when this has at least one electric measuring conductor, the electric resistance of which changes in relation to a force exerted on the measuring conductor.

In order to be able to detect corresponding resistance changes simply via associated voltage changes, the electric measuring conductor may be connected as a resistor in a bridge circuit, such as a so-called Wheatstone bridge.

The electric measuring conductor may be made as a conducting wire or by a number of conductor wires arranged in parallel. In the case of using several conducting wires corresponding statistical deviations of individual wires are compensated.

In order to be able to compensate temperature drifts of the electric measuring conductor, a further electric measuring conductor may be connected without force loading in the bridge circuit for temperature compensation.

Advantageous embodiments of the invention are explained in greater detail below by means of the figures given in the drawing.

Here:

FIG. 6 shows a longitudinal section through a linear actuation device with built-in path measuring device in a partial representation;

FIG. 7 shows an enlarged representation of a detail "X", and

FIG. 8 shows an enlarged representation of a detail "Y"

Figure 1:
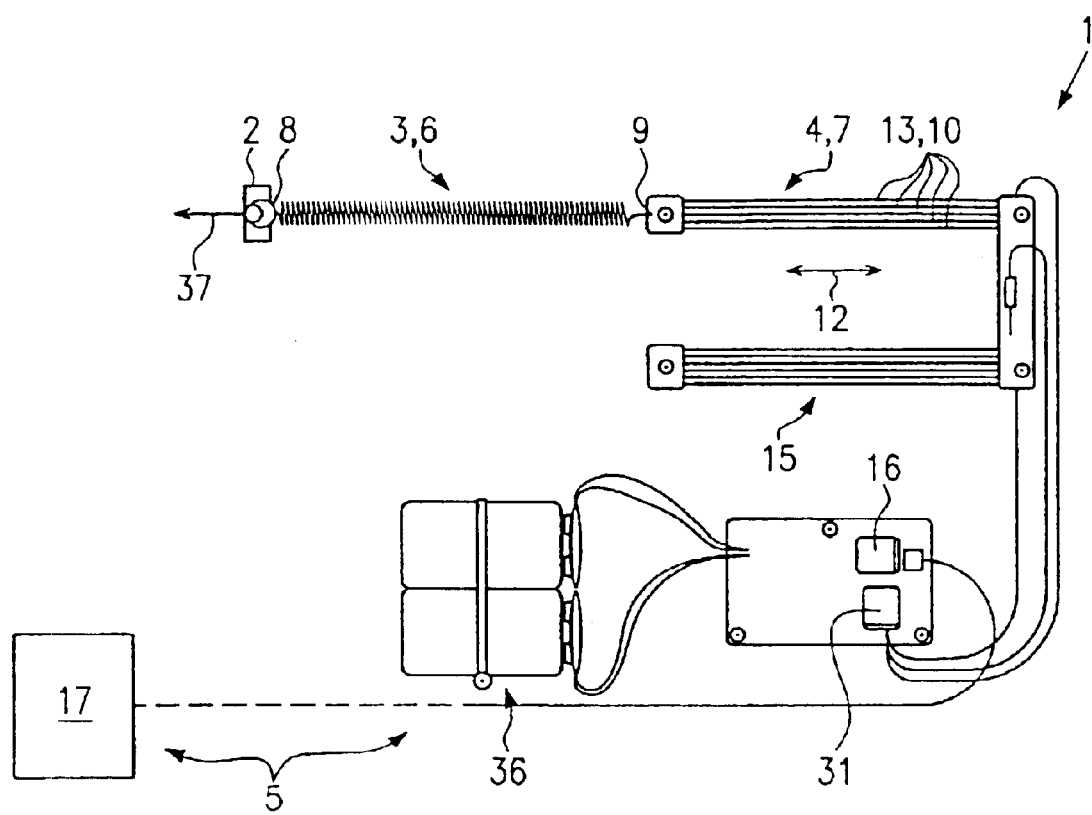
FIG. 1 shows a top view of a basic representation of a specific embodiment of path measuring device according to the invention.

FIG. 1 shows a top view of a basic embodiment of a path measuring device 1 according to the invention. The latter has a spring element 6 as a first component and a force measuring device 7 as a second component 4. The first component 3 is connected with a moving object 2 at one end 8. In the case of motion of moving object 2 in the direction 37, the spring element 6 is stretched and a corresponding force is exerted over ends 9 of the spring element 6 on the second component 4, that is, force measuring device 7. By means of the force measuring device 7 the force exerted is converted into an electric signal, from which a corresponding position of the moving object 2 is determined by the connected evaluation unit 5.

The moving object 2 moves linearly in the direction of motion 37 and in the longitudinal direction 12 of the spring element 6 or the force measuring device 7.

The force measuring device 7 is formed by an electric conductor 10, that may include a number of electric conducting wires 13. The latter change their resistance in relation to the force exerted on them. This means, a resistance change of electric conducting wire 13 corresponds to a force transmitted through the spring element 6 and the force is proportional to a deflection of the spring element 6 and thus to a position of the moving object 2.

The wires 13 are arranged parallel to each other and may be connected electrically parallel or in series. The wires 13 form a resistance, that is part of a bridge circuit, see FIG. 5. A further resistor 15 of this bridge circuit also is formed by a number of electric conducting wires and this further electric resistance 15 corresponds to the resistance formed by electric conducting wires 13 and thus to the temperature compensation.

An offset device 31, 32, and an amplifier 16 is connected with the resistors formed by the wires. Corresponding signals are sent to an output unit of the evaluating unit 5, in which case this evaluating unit 5 also may have a differentiator 17, through which the corresponding position values changing of the moving object 2 changing with time are differentiable and thus a speed and, in a given case, acceleration, of the moving object may be determined.

A zero point of the deflection of the spring element 6 may be set by the offset device 31, 32. For example, the spring 2 may be pre-stressed up to 5%, in order to generate such a measurable zero point for the motion of the moving object 2. A tension value associated with this pre-stress is set to zero by means of the offset device 31, 32.

A power supply 36 is connected with the wires and the evaluation unit for the voltage supply of the wires and the evaluation device 5.

Figure 2:
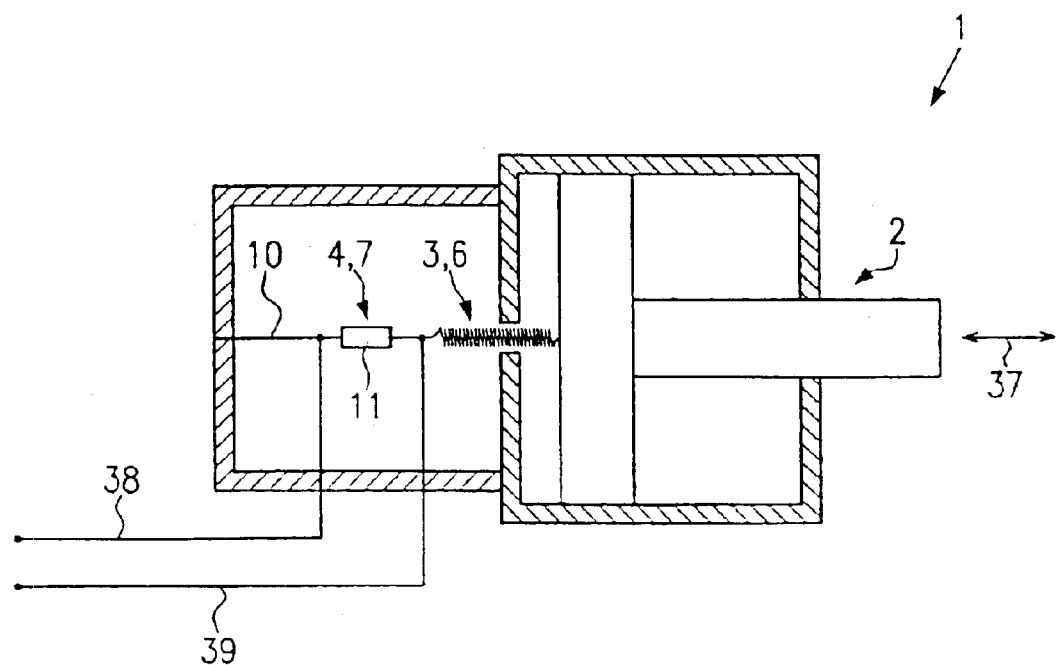
FIG. 2 shows a partially cut top view of a second specific embodiment.

FIG. 2 shows a further embodiment of a path measuring device analogous to FIG. 1. The moving object 2 is formed by a piston placed movably in a housing in the moving object 37.

The piston is connected on its backside with the spring element 6. An electric conductor 10 is connected in series to the spring element 6 as a force measurer 7 with resistance 11, which is attached to its end on the housing opposite the spring element 6. The resistance 11 is connected via two connecting lines 38, 39 with a corresponding bridge device, see FIG. 5.

Figure 3:
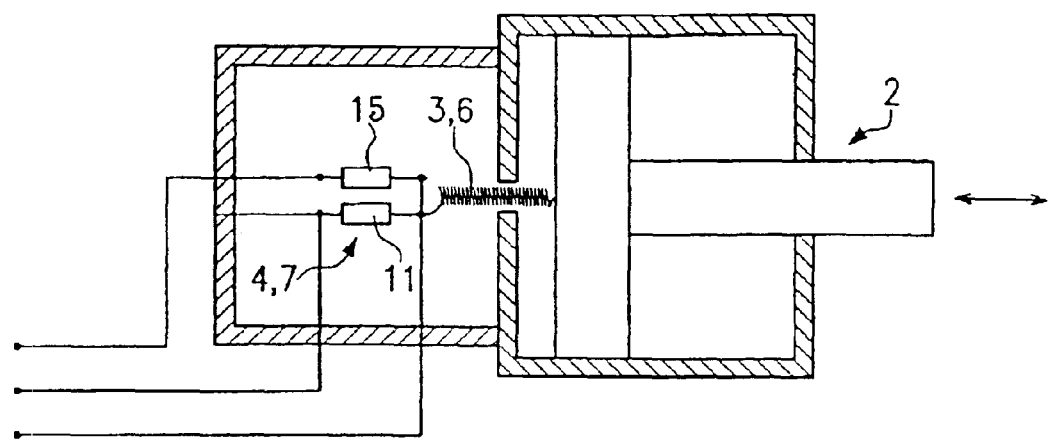
FIG. 3 shows a partially cut top view of a third specific embodiment.
Figure 5:
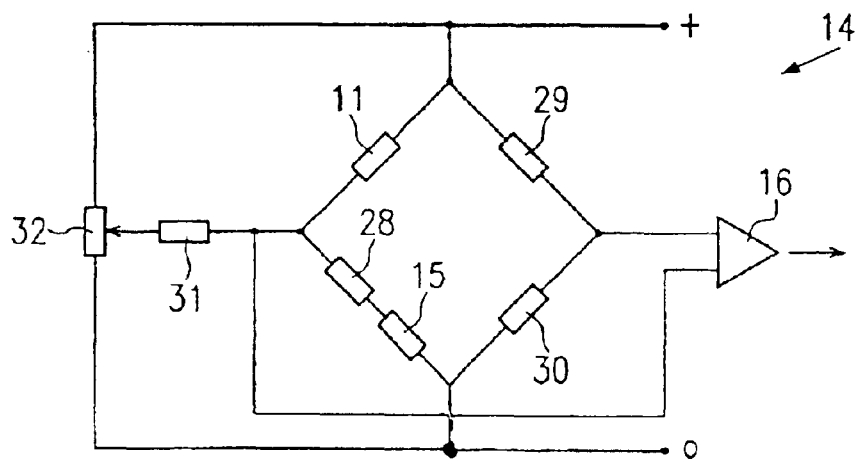
FIG. 5 shows a circuit diagram analogous to FIG. 4.

FIG. 3 shows a further embodiment analogous to FIG. 2. This embodiment corresponds to the embodiment shown in FIG. 1, a further resistor 15 being located analogous to resistor 11, and part of the bridge circuit being as shown in FIG. 5. As an example, temperature compensation of the path measurement is possible by means of the further resistance 15 in the immediate vicinity of the resistance 11.

Figure 4:
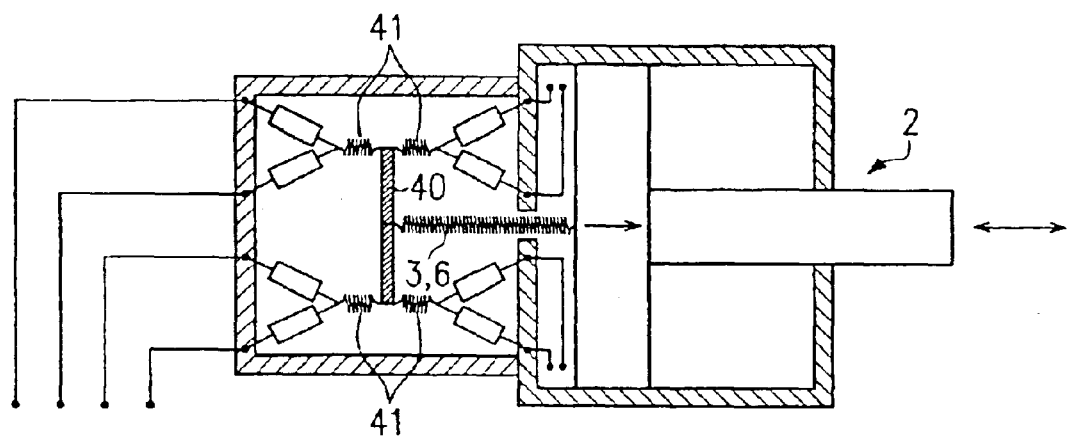
FIG. 4 shows a partially cut top view of a fourth specific embodiment.

FIG. 4 shows a fourth embodiment analogous to the preceding FIGS. 2 and 3. In the case of this embodiment, a force measurement performed takes place via all resistors of the bridge circuit shown in FIG. 5. The spring element 6 acts correspondingly on all conductors that may be formed at least partially by separate spring elements. Depending on the deflection of a connecting plate 40 connected in the middle with spring element 6, the corresponding individual elements 41 are stretched or compressed and corresponding resistance changes are induced.

A circuit diagram for a bridge circuit for determining a resistance change and thus a corresponding voltage change is shown in FIG. 5 in the form of a so-called Wheatstone bridge. Such a circuit is known per se. The circuit is formed by at least four resistors, of which for example, resistors 29 and 30 are made with the same resistance value. At least one resistor of the bridge circuit is formed by the resistor 11 of the electric conductor 10, see FIG. 2. The resistors 15, 28 may also be formed by a resistor independent with respect to the path measurement. A a rule, of course, this is variable, in order to compensate the bridge circuit to zero initially before deflection of the moving object.

In the case of the embodiment according to FIG. 5, the resistor 15, see FIG. 3, is formed by a number of electrica wires, see also FIG. 1. In this case resistor 15 is used for temperature compensation of resistor 11. An offset adjustment, that is, the adjustment of a zero point possible by means of the resistor 31 in connection with the resistor 32.

The signals detected are transmitted via an amplifier 16, see also FIG. 1, for further processing to the evaluation device 5 of the bridge circuit 14.

One branch of the bridge circuit is grounded; see "O" and the other branch is on the plus pole of a power supply.

FIG. 6 shows an example of application for an embodiment of path measuring device 1 according to the invention. In this case path measuring device 1 is located in a linear drive device 21, such as, for example, as described in DE 20 008 415 of the same applicant. Such a linear drive device 21 has at least one actuation element 20, that is movable back and forth in the linear direction. As a rule, the actuation element 20 is a spherical spindle, that is mounted capable of turning in a spherical rotating nut. When the spherical rotating nut turns by means of a drive device 21, shown in FIG. 6, there is a corresponding rotation of the actuation element 20 and a motion of the actuation element 20 results from the rotation relative to the spherical rotating nut that is fixed in the longitudinal direction.

The actuation element 20 is connected on one end 22, see also FIG. 8, with spring element 6 of the path measuring device 1. The spring element is guided into a tube 23 by drive device 21 and connected with its end opposite the actuation element 20 with a corresponding force measuring device 7 in the form of an electric measuring conductor 27. The conversion of the force exerted by the actuation element 20 on the spring element 6 by means of the force measuring device 7, respectively the corresponding electric measuring conductor 27, takes place analogous to the embodiments of the path measuring device 1 described above.

The spring element 6 according to FIGS. 6 to 8 is connected via connecting pieces 24 and 26 with the activating element 20, respectively with electric measuring conductor 27.

At least the connecting piece 24 has a rotation coupling device 26. This prevents transmission of the rotation of the actuation element 20 made as a spherical spindle to spring element 6. The rotation coupling device 26 may, for example, be made as a screw that is screwed into the actuation element 20 at the end 22 thereof, and which is mounted capable of turning in the connecting piece 24 but fixed in the longitudinal direction of the spring 6.

FIG. 7 corresponds to an enlarged representation of section "X" from FIG. 6 and FIG. 8 is an enlarge representation of section "Y" from FIG. 6.

FIG. 7 shows connection of the spring element 6 with the connecting piece 25. This is connected with the electric measuring conductor 27 that is attached at its end opposite the spring element 6 at a fixed point 25 of the housing 19 of the linear actuation device 18. Corresponding connecting wires are connected to the electric measuring conductor 27 via solder points 33, 34, that lead to a bridge circuit 14, see FIG. 5.

According to the invention, in particular it is possible to measure a linear motion of a moving object 2 in a simple and economical way. The measurement is performed by having a coercive force exerted by a spring element 6 at the time of motion of the moving object 2. Of course, this force is so small that it does not, or only slightly, hinders the desired motion of moving object 2. The coercive force exerted by spring element 6 is transmitted to an electric conductor as a force measuring device 7. The electric conductor has, for example, a number of wires, the resistance value of which is determined by a corresponding change of a decreasing voltage on the resistor, this resistance change and thus also the associative voltage change being dependent on the force exerted. If the force that is exerted by the spring element on the moving object 2, is determined from the resistance changes by corresponding calculations, the deflection of the spring and thus the position of the moving objects 2 may be determined in a simple way from the force if the corresponding parameter (elastic constant) of the spring element 6 is known.

What is claimed is:

1. A linear control device, in particular for controlling valves, throttles, or the like, in oil and/or gas production, comprising: a control element capable of moving linearly within a housing and a linear drive device associated with the housing, wherein the control element is connected on one end with a spring element, which is connected with an end turned away from the control element with a force-measuring device, which transmits an electrical signal corresponding to a force transmitted from the spring element to the force-measuring device to an evaluating unit which determines the motion and/or position of the control element with respect to the housing.

2. The linear control device according to claim 1, wherein the spring element is guided in a tube and expanded as the control element moves linearly within the housing.

3. The linear control device according to claim 1, wherein the spring element is attached at first and second ends via connecting pieces to the control element and the force-measuring device.

4. The linear control device according to claim 1 wherein the force-measuring device has at least one electrical conductor with electrical resistance which is dependent on a force exerted onto a conductor.

5. The linear control device according to claim 1 wherein the electrical conductor is connected as a resistor in a bridge circuit.

6. The linear control device according to claim 1 wherein the electrical conductor has a number of conductor wires arranged in parallel.

7. An apparatus for actuator-controlled valve operation comprising:
   a linear drive device selectively moving an operating element;
   a path-measuring device connected to the operating element;
   the path-measuring device including a spring and a force-measuring device;
   the spring having one end connected to the operating element and another end connected to the force-measuring device; and
   the force-measuring device measuring the force placed on the spring by the operating element as the linear drive device moves the operating element.

8. The apparatus of claim 7 wherein the linear drive device includes a tube housing the spring.

9. The apparatus of claim 7 the force-measuring device includes an electrical measuring conductor.

10. The apparatus of claim 7 wherein the force-measuring device converts the force on the spring to a corresponding voltage.

11. The apparatus of claim 10 wherein the electrical measuring conductor includes one or more wires having a resistance value which varies with the exertion of a tensile force by the operating element on the spring.

12. The apparatus of claim 11 wherein the change of the resistance value is determined by a corresponding change of a voltage decreasing on the resistor, the resistance change and also the voltage change depending on the force exerted.

13. The apparatus of claim 7 wherein the spring is connected to the operating element by a rotation decoupling device.

14. The apparatus of claim 7 wherein the operating element exerts a retaining force on the spring.

15. A linear control device, in particular for controlling valves, throttles, or the like, in oil and/or gas production, comprising: a control element capable of moving linearly within a housing and a linear drive device associated with the housing, wherein the control element is connected on one end with a spring element, which is connected with an end turned away from the control element with a force-measuring device, which transmits an electrical signal corresponding to a force transmitted from the spring element to the force-measuring device to an evaluating unit, wherein at least the connecting piece has a rotation decoupling device between the spring element and the control element.

16. A linear control device, in particular for controlling valves, throttles, or the like, in oil and/or gas production, comprising: a control element capable of moving linearly within a housing and a linear drive device associated with the housing, wherein the control element is connected on one end with a spring element, which is connected with an end turned away from the control element with a force-measuring device, which transmits an electrical signal corresponding to a force transmitted from the spring element to the force-measuring device to an evaluating unit, and wherein an electrical conductor is connected without the action of force in bridge circuit at least for temperature compensation.

* * * * *